Nov. 5, 1935.　　　　　E. F. JONES　　　　　2,019,820
MANUFACTURE OF HOLLOW INGOTS AND TUBES
Filed Dec. 6, 1933　　　　4 Sheets-Sheet 1
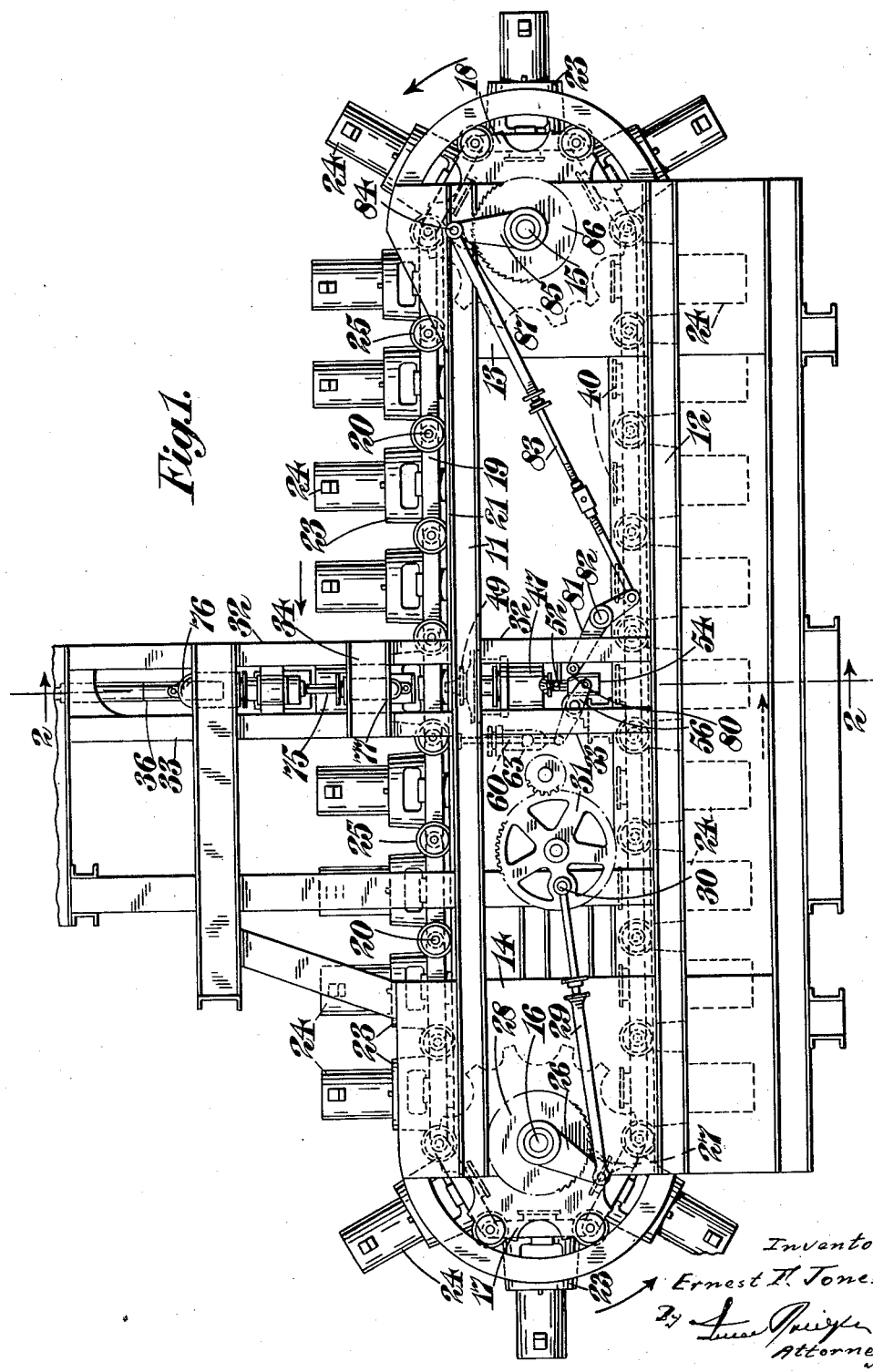

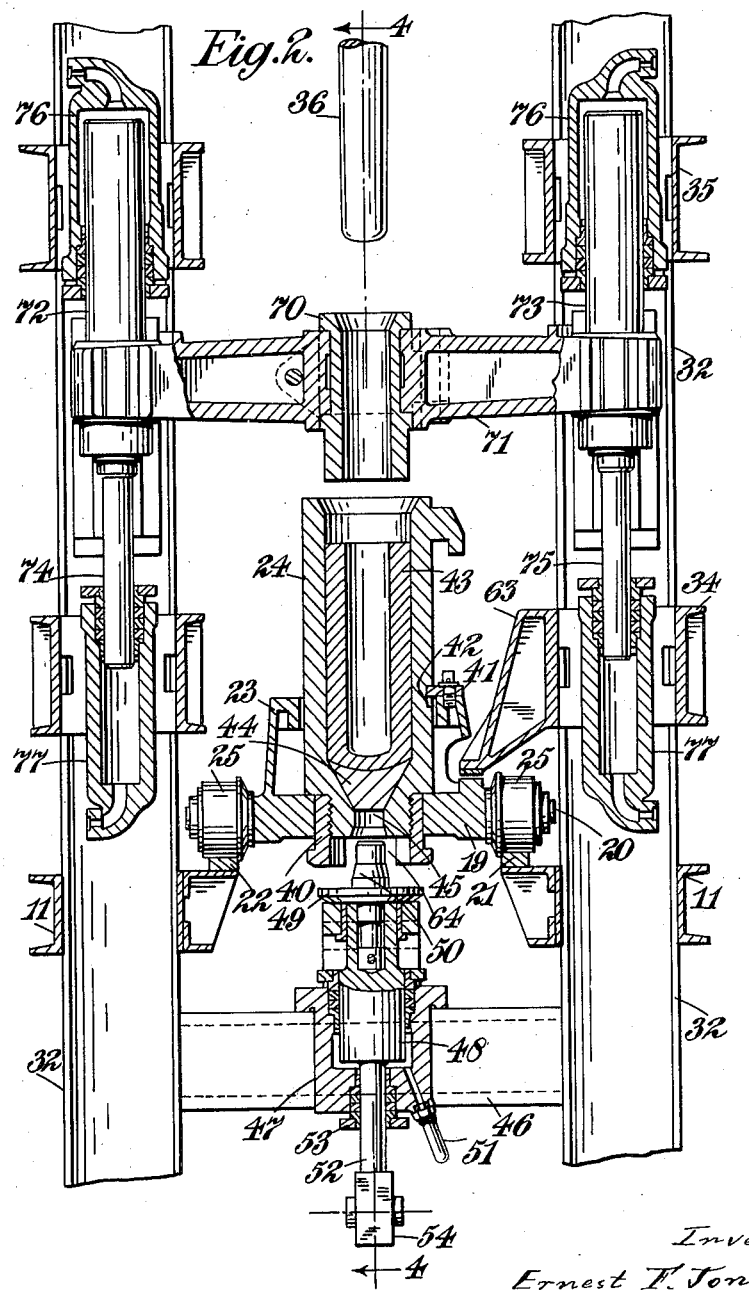

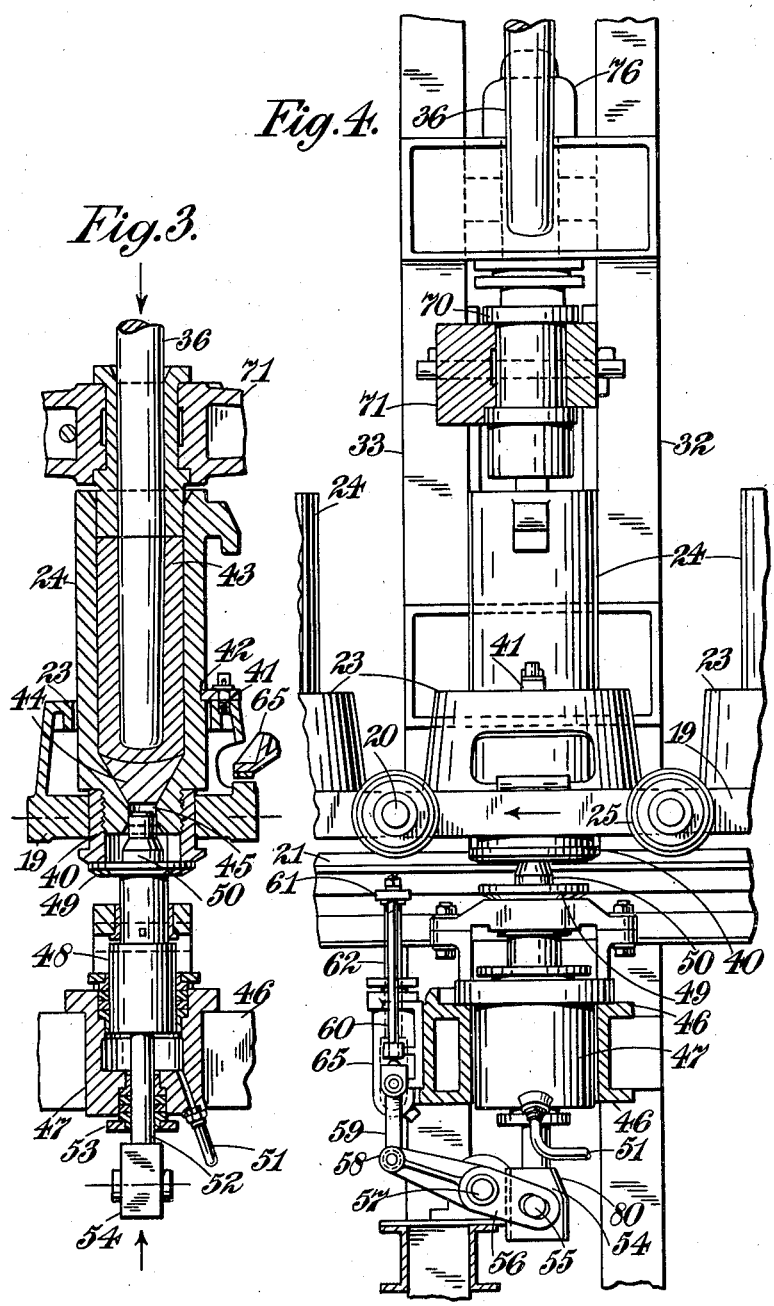

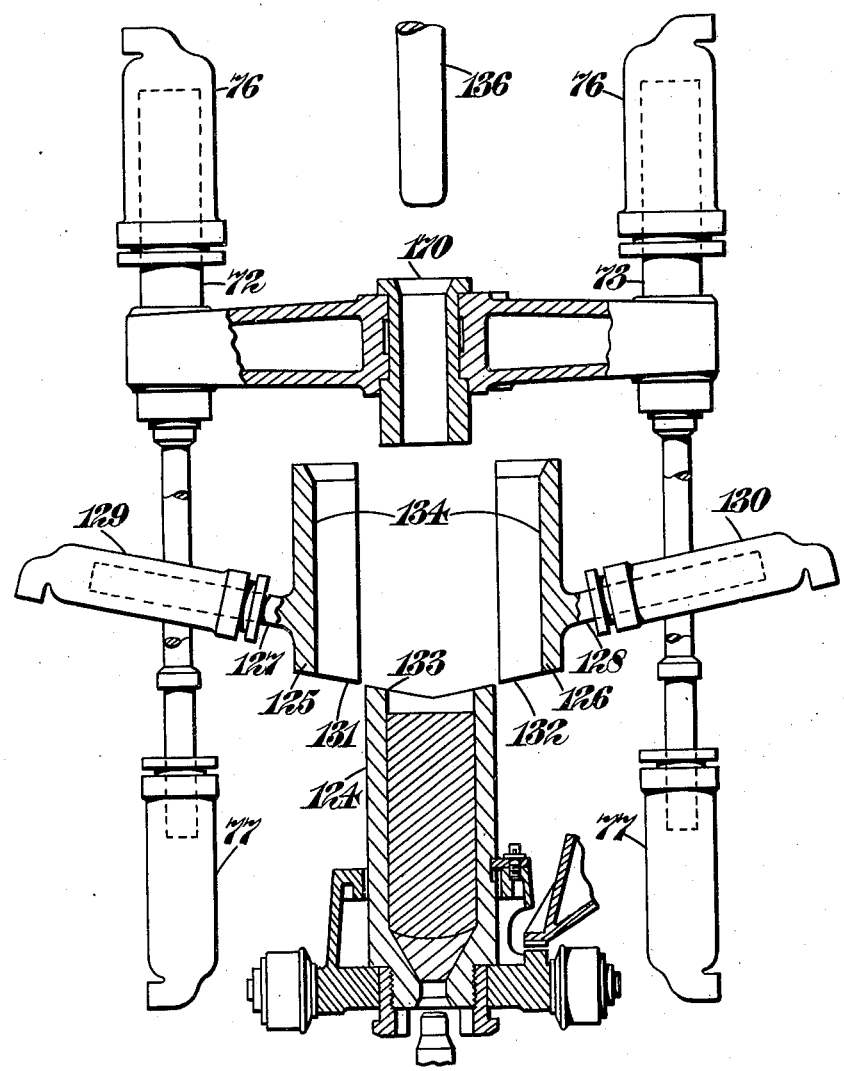

Patented Nov. 5, 1935

2,019,820

UNITED STATES PATENT OFFICE 2,019,820

MANUFACTURE OF HOLLOW INGOTS AND TUBES

Ernest Fraser Jones, London, England, assignor to Fraser-Jones Limited, Johannesburg, Transvaal Province, Union of South Africa Application December 6, 1933, Serial No. 701,216
In Great Britain December 21, 1932

6 Claims. (Cl. 22—76)

This invention comprises improvements in or relating to the manufacture of hollow ingots and tubes. In prior United States Patent No. 1,938,257, dated December 5, 1933, there is described a process of producing hollow ingots for the manufacture of metal tubes in which a plunger is introduced axially into a mould partially filled with molten metal so as to press the metal to the form of a hollow ingot, and the surface of the metal between the sides of the plunger and the walls of the mould is subjected to pressure applied at is upper surface during solidification. The purpose of the application of pressure around the annular upper surface of the ingot is to compress the metal and prevent the formation of "pipes", the pressure-applying member following the metal downwards into the mould as the latter contracts on cooling. Sound ingots are thereby ensured.

In this process it is necessary to withdraw the plunger as soon as possible after solidification of the molten metal and considerable force is necessary to effect the required withdrawal.

The present invention comprises in apparatus for the manufacture of hollow ingots the combination of an ingot mould open at the top, a plunger, means for supporting the plunger above the mould and for lowering it thereinto, a sleeve to surround the plunger and means for lowering the sleeve into the mould so as to press on to metal therein and a releasable mould-support for supporting the mould against downward pressure of the plunger and/or sleeve, such that when released the mould is capable of downward movement relatively to the plunger under the influence of pressure on the sleeve. In use of this apparatus when the metal has solidified in the mould the support is released so that the mould with the shaped metal contained therein is forced downwardly off the end of the plunger by the pressure of the annular sleeve-member. By this means release of the plunger is effected by the application of pressure in the same direction and by the same means as that which compresses the metal in the mould and the plunger is freed so that its subsequent retraction becomes easy.

Preferably the plunger is tapered and the mould support is such that downward movement of the mould may take place gradually during solidification of the ingot. This allows the metal to contract in solidifying and not only tends to free the plunger but also to prevent internal cracking of the ingot.

The mould-support may comprise an hydraulic cylinder and ram so that the mould is supported by operating the ram and released by releasing hydraulic pressure therefrom.

The downward pressure of the annular member may be likewise effected by hydraulic plungers and the oil pressure for supporting the mould and for operating the annular pressure member may be derived from the same source. The construction of the hydraulic mechanism for operating the annular pressure member may be similar to that described in co-pending United States application No. 669,046, filed May 2, 1933.

Oil pressure is preferred to water pressure for working the hydraulic plungers because should any leakage of oil take place this is less likely than water to lead to explosions if it comes in contact with heated steel.

Preferably the mould is subjected during the setting of the metal to strong vibration. The purpose of the vibration is to cause the metal to assume a more compact form and to avoid the production of "pipes".

The vibration may be applied either by a rapid movement of the mould (for example in a vertical or axial direction) or it may be applied by effecting a hammering action upon the exterior of the mould itself.

If desired the vibration may be maintained, for example by hammering upon the exterior of the mould, during the period in which the plunger is freed from the molten metal after the metal has set by downward pressure of an annular sleeve surrounding the plunger upon the top of the metal, the mould being allowed to descend during this operation.

The hammering action upon the exterior of the mould may be effected by applying an automatic hammer thereto, such, for example, as a pneumatic hammer, and the hammer may either be incorporated in the design of the apparatus or may be constituted by a separate pneumatic hammer manually applied.

The following is a description by way of example of one form of the apparatus in accordance with the invention, as applied to an ingot casting machine having a plurality of moulds arranged upon an endless conveyor chain.

In the drawings:—

Figure 1 is an elevation of part of the machine;

Figure 2 is a cross section on the line 2—2 of Figure 1 looking in the direction of the arrows;

Figure 3 is a detail of certain of the parts shown in Figure 2;

Figure 4 is a view looking in the direction of the arrows 4—4 of Figure 2, of the exterior of those parts which are co-axial with the centre line of Figure 2; and Figure 5 is a diagrammatic view of a modified construction.

Referring to Figure 1, the machine comprises a framework consisting of horizontal joists 11, 12 spaced apart towards their ends by vertical plates 13, 14 and supporting between the plates spindles 15, 16 which carry sprocket wheels 17, 18, one at one end and the other at the other end of the framework. A chain conveyor formed of links 19 pivoted together by hinge pins 20 extends around the sprocket wheels 17, 18 and the upper length of the conveyor runs along rails 21, 22 supported on the horizontal side members of the framework. The rails 21, 22 form a runway and the hinge pins 20 of the conveyor carry rollers 25 which run along the rails. Mounted upon the links 19 there are a series of mould carriers 23 which contain moulds 24, one mould being allocated to each link of the conveyor.

Means are provided for moving the conveyor forward step by step by an amount equal to the pitch of the links of the chain. This feeding means does not in itself comprise any part of the present invention but it is indicated in the drawings as consisting of a crank member 26 mounted to turn about the spindle 16 and carrying at its free end a pawl 27 to engage a ratchet wheel 28 fixed to the spindle 16. The free end of the crank member 26 which carries the pawl is also pivoted to a connecting rod 29 the other end of which is secured upon a crank-pin 30 on a spur wheel 31. The radius of the crank-pin 30 is so related to the radius of the crank member 26 that a complete rotation of the crank-pin 30 will swing the crank member 26 to and fro through an arc slightly exceeding 60°. Rotation of the spur wheel 31 will, therefore, produce an intermittent advance movement of the sprocket 17 through an arc of 60° for each rotation of the spur wheel, the advance movement being alternated with a period of rest. The spur wheel 31 is driven through suitable reduction gearing from an electric motor.

About midway along the length of the conveyor there is mounted a framework consisting of uprights 32, 33 united by cross members 34, 35 and in the upper portion of the framework means are mounted, not shown in the drawings, for raising and lowering a plunger 36 so that it may enter the moulds below or be withdrawn therefrom. The conveyor and the operating mechanism therefor are so designed and arranged as to advance the moulds step by step into positions in which each of them in turn comes approximately centrally beneath the plunger 36. Means hereinafter described are provided to ensure exact centering before the plunger descends and the plunger-operating mechanism is such as to raise it from the mould after the metal has set in the mould and before the conveyor executes a fresh advance movement to bring a new mould into position beneath the plunger. Means for raising and lowering the plunger are not herein described in detail as they do not in themselves form part of the present invention and they may be constructed in any suitable way.

Preferably means are provided for using several plungers seriatim so as to avoid overheating any one plunger by too frequent immersion in molten metal, but such means form no part of the present invention.

As will be observed from Figures 2—4, the chain links 19 are constituted by rectangular plate-shaped castings. These fit together like a hinge at the joints of the links and the pins 20 constitute hinge-pins. The moulds 24 are substantially circular in plan and they comprise a cylindrical bottom portion 40 which passes through an aperture in the links 19 and is provided with a head below the link, the dimensions being such that the member 40 can slide up and down through the link to a limited extent. The mould is held from turning relatively to the conveyor by means of a locking plate 41 bolted to the upper side of the mould carrier 23 and provided with a projecting portion which enters a notch 42 in the side of the mould. The mould may be removed from the carrier by unscrewing the locking plate 41 and unscrewing the sliding member 40 from the underside of the mould. This construction permits of changing the moulds in a given machine so that various sizes of moulds can be employed in accordance with the size of ingot required. In Figures 2 and 3 the ingot itself is shown at 43 and it will be observed that the bottom of the mould is stopped by a conical plug 44 which overlies a central aperture 45 extending right through the mould and flared outwardly at its bottom end. Figure 3 shows the parts in the position which they assume when the metal has been poured, the plunger lowered into place and the ingot is solidifying. Figure 2 shows the parts in the position which they assume after withdrawal of the plunger when the conveyor is about to move forward a further step in readiness to bring a new mould beneath the plunger. It will be understood that means are provided to feed molten metal to the moulds before reaching the plunging position. Such means would comprise a suitable ladle and means for measuring the amount of metal poured into the moulds but they are not shown in the drawings as they constitute no part of the present invention.

Below the mould 24 and the rails 21, 22 there is a cross member 46 which extends from side to side of the machine, being supported upon the uprights 32, 33. This carries a cylinder 47 for an hydraulic ram 48 located co-axial with the mould 24 and the plunger 36. The upper end of the ram 48 carries a mould-lifting table 49 and a centralizing pin 50 upstanding from the table. The pin 50 is designed to enter the aperture 45 in the bottom of the mould and thereby to bring the mould exactly central beneath the plunger 36. The table 49 constitutes a mould-support and when the ram 48 rises it lifts the mould a short distance towards the plunger, causing it to slide through the link 19 and mould-support 23 as already described. There is an oil pressure supply pipe 51 to the cylinder 47 and means are provided to connect this to an oil pressure supply, together with a control cock so designed that either pressure may be admitted to the cylinder, oil contained therein may be locked there against outflow, or in another position of the cock may be exhausted from the cylinder.

A tail rod 52 projects through the bottom of the cylinder, leakage being prevented by a stuffing gland 53. The tail rod 52 carries a block 54. The block 54 has pins 55 projecting from it co-axial with one another on opposite sides and the pins enter slots in a forked lever 56 pivoted at 57 on a cross-bar supported from the frame of the machine. The lever 56 projects beyond the pivot point to a pin 58 by which it is connected to links 59. Two links 59 are provided which lie one before the other in Figure 4 of the drawings and they are connected to two pull-rods 60 united together at the top by a crosshead 61, the centre of which is secured to the upper end of a ram 62 working in a return cylinder 63. By applying hydraulic pressure to the return cylinder 63 the ram 62 is raised and by lifting the pin 58 of the lever 56 it will serve to draw down the block 54, tail rod 52 and ram 48. This ensures positive lowering of the ram when pressure in the cylinder 47 is released. The cylinder 63 will normally have a constant hydraulic pressure applied thereto, but as it is much smaller than the cylinder 47 its effect will be overbalanced by the latter whenever pressure is applied in the larger cylinder. It will be observed that the bottom sliding portion 40 secured to the mould 24 is notched out as shown at 64, Figure 2, to permit the centering pin 50 of the mould-supporting table to lie close to the bottom of the mould without interfering with the movements of the conveyor when the pin is in its lowered position.

A bracket 65 is formed on the cross member 34 of the framework so as to overlie one side of the link 19 where the mould-support is located and to prevent the mould-support lifting the link when it rises to engage the mould. The mould and mould-support are shown in the lifted position in Figure 3.

Above the mould in Figure 2 is shown a sleeve 70 removably mounted in a crosshead 71 which extends across the machine from side to side and carries at its two ends upper rams 72, 73 and lower rams 74, 75. The upper rams 72, 73 enter sleeve-lowering cylinders 76 and the lower rams 74, 75 enter sleeve-raising cylinders 77. The sleeve 70 is co-axial with the plunger 36 and of such a size that it can enter the upper ends of the moulds 24 below. The mouths of the moulds are flared somewhat to facilitate entry of the sleeve and to allow the sleeve to centre the upper end of each mould as it enters the same. It will readily be understood that by appropriate oil supply means and controlling arrangements pressure may be admitted to the upper cylinders 76 when desired to cause the sleeve to enter the mould. These cylinders are larger than the lower cylinders 77 and if a constant oil pressure is maintained in the latter then the sleeve will be raised as soon as pressure is liberated from the upper cylinders 76. When the pressure is applied in the cylinders 76 the sleeve is lowered because the power of these cylinders overcomes the inferior force of the lower cylinders 77. The bore of the sleeve 70 is such as to receive and centre the plunger 36 while leaving it free to descend through the sleeve and enter the molten metal in the mould 24 below.

The block 54 on the tail rod 52 of the ram 48 is formed with a cam face 80 on one side and this cam face co-operates with a cam lever 81 (Figure 1) pivoted on an axis at 82 extending transversely across the machine and connected to a connecting rod 83. The connecting rod 83 extends to a pin 84 on a crank arm 85 pivoted freely about the spindle 15 of the sprocket 18 which supports the conveyor at the opposite end from the driving sprocket 17. Fast upon the spindle 15 is a ratchet wheel 86 and the crank arm 85 carries a pawl 87 to engage with the ratchet wheel. The cam face 80 is so located that during the initial movement of the ram 48 in an upward direction and before the centering pin 50 enters the mould aperture 45, tension is applied to the connecting rod 83 and the sprocket 18 is thereby moved slightly in an anti-clockwise direction as viewed in Figure 1 of the drawings, thus relieving the conveyor links 19 of any tension under which they might otherwise lie as a result of the feeding movement due to the sprocket wheel 17. This relief of tension of the links in the upper part of the conveyor enables the centering pin 50 to centre the mould 24 easily.

In operation of the machine, when one of the moulds 24, filled with molten metal, has arrived beneath the plunger 36, oil under pressure is first admitted to the cylinder 47 thereby raising the ram 48. This after initially relieving the tension in the links of the conveyor as just described centres the mould by the action of the pin 50 and then lifts the mould into the position shown in Figure 3. Thereafter the sleeve 70 is lowered a short distance into the mouth of the mould by admission of a limited quantity of oil under pressure to the upper cylinders 76, thus centering the upper end of the mould. The plunger 36 then descends and enters the molten metal which flows upwardly round the plunger as it is displaced thereby until it nearly fills the mould. The sleeve 70 is then further lowered so as to press firmly on the upper annular surface of the molten metal and this pressure is maintained during solidification of the metal. During solidification of the metal a slight escape of oil is allowed from the cylinder 47, thereby allowing the mould to fall gradually and permitting the ingot to contract during solidification around the tapered portion of the plunger.

As soon as the metal is sufficiently solidified to be able to retain its shape, even if the plunger were withdrawn, oil, which up to this point, although escaping, had been held under pressure in the cylinder 47 is now freely released from that cylinder and thus the mould-supporting table 49 becomes free to descend fully. Pressure is still maintained in the upper or sleeve-lowering cylinders 76 and as this pressure is now no longer resisted by the mould-support 49 the sleeve is able to force the moulded ingot and the mould downwardly off the tapered lower portion of the plunger 36. The plunger 36 is restrained by its operating mechanism from downward movement along with the ingot and thus the plunger is freed from the ingot and may be lifted readily out of the ingot mould by its control mechanism.

By this means the mechanism for raising and lowering the plunger may be made much lighter than would be the case had the necessary force for freeing the plunger from the ingot to be applied by the plunger-raising mechanism itself.

If vibration is to be applied to the mould as already referred to, this may be done during the setting of the ingot by applying a pneumatic hammer to the side of the mould, maintaining the hammering if necessary during release of the plunger and its upward withdrawal.

As soon as the plunger is clear the pressure is released from the upper cylinders 76 and the sleeve 70 is thereby lifted clear of the mould in time to permit the next advance or feeding movement of the conveyor.

It will, of course, be understood that the speed of the conveyor feeding mechanism must be designed to correspond with the time taken by the ingots to set in their moulds and the associated mechanisms to perform their allotted operations.

Referring to Figure 5, this shows diagrammatically a modified arrangement which may be employed when very narrow deep moulds are to be used. Under these conditions it becomes difficult to pour the molten metal to the bottom of the mould without touching the sides. If the metal touches the sides during pouring it becomes unduly cooled, while the mould becomes unevenly heated. Moreover, in a very deep mould there is a tendency for the metal to splash as it is poured.

Accordingly, in Figure 5 the mould is constructed in three sections, of which the bottom section 124 is similarly constructed and corresponds to the moulds 24 already described.

The upper sections 125, 126 each constitutes one-half of a vertically divided top portion to the mould, and they are mounted on hydraulic plungers 127, 128 operated by cylinders 129, 130 at the sides of the machine in the same plane as the axis of the plunger 136 and sleeve 170. The direction of movement of the plungers 127, 128 is transverse to the direction of advance of the moulds 124.

In operation the moulds 124 are substantially filled with molten metal and in this condition arrive beneath the plunger 136. The upper mould sections 125, 126 are then advanced towards one another so that they meet above the mould 124 and their lower faces 131, 132 are arranged to fit closely against the upper faces 133 of the mould 124 while their internal vertical surfaces 134 constitute extensions of the inner walls of the mould 124.

Thereafter entry of the sleeve 170 and descent of the plunger 136 takes place as hereinbefore described, the upper parts of the mould 125, 126 serve to receive the molten metal forced upward out of the lower section 124 by the action of the plunger. As soon as the metal is set and the sleeve 170 and plunger 136 have been withdrawn the upper sections of the mould 125, 126 are withdrawn also and the lower part of the mould carries the now-solidified ingot forward. It will be observed that the lower portion of the mould constitutes a vessel into which it will be easy to pour the molten metal without danger of touching the sides during pouring. A further advantage of sub-dividing the mould as described is that the weight of the moving moulds upon the conveyor is reduced as compared with the weight which they would have were they constructed deep enough to accommodate the full height of the ingots and therefore the weight of the conveyor and moulds taken as a whole is reduced. As this weight (which is very great) has to be started and brought to rest at every step of the conveyor the advantage of thus reducing its inertia and momentum is considerable.

The control of the periods of and amount of admission of oil to the various cylinders is automatically effected by a control mechanism, such, for example, as that described in United States application No. 669,046 hereinbefore referred to.

I claim as my invention:—

1. In apparatus for the manufacture of hollow ingots, the combination of a chain conveyor having a plurality of links, a plurality of moulds open at the top mounted in series upon said conveyor, each mould being slidably mounted for vertical movement relatively to the links of the chain conveyor, means for feeding said conveyor step by step to bring the moulds successively into operating positions, a plunger, means for supporting the plunger above an operating position for the moulds and for lowering it thereinto, a vertically movable mould-support below the conveyor axially in line with the plunger, and means to raise the mould-support towards the plunger for each plunging operation.

2. In apparatus for the manufacture of hollow ingots, the combination of a chain conveyor having a plurality of links, a plurality of moulds open at the top mounted in series upon said conveyor, means for feeding said conveyor step by step to bring the moulds successively into operating positions, a plunger, means for supporting the plunger above an operating position for the moulds and for lowering it thereinto, a vertically movable mould-support below the conveyor axially in line with the plunger, means to raise the mould-support towards the plunger for each plunging operation, a mould-centering device associated with the mould support, and means for insuring that the links of the chain conveyor are slack when the mould-support and centering device are operated.

3. In apparatus for the manufacture of hollow ingots, the combination of a chain conveyor having a plurality of links, a plurality of moulds open at the top mounted in series upon said conveyor, means for feeding said conveyor step by step to bring the moulds successively into operating positions, a plunger, means for supporting the plunger above an operating position for the moulds and for lowering it thereinto, a vertically movable mould-support below the conveyor axially in line with the plunger, means to raise the mould-support towards the plunger for each plunging operation, a hydraulic ram located beneath said chain conveyor and carrying said mould support, sprockets supporting the ends of said chain conveyor, a pawl-and-ratchet device operatively connected to one of the sprockets so that upon actuation it tends to make the links of the chain conveyor beneath the plunger slack, and means operatively connecting the pawl-and-ratchet device to the hydraulic ram of the mould-support so as to be actuated thereby.

4. In apparatus for the manufacture of hollow ingots, the combination of an ingot mould open at the top, a plunger, means for supporting the plunger above the mould and for lowering it thereinto, a sleeve to surround the plunger, means for lowering the sleeve into the mould so as to press onto metal therein, and a releasable mould-support for supporting the mould against downward pressure, such that when released the mould is capable of downward movement relatively to the plunger under the influence of pressure on the sleeve, said mould being constructed in sections comprising a bottom section deep enough only to contain the molten metal before depression of the plunger, and an upper section or sections which can be superimposed over the bottom section after the pouring operation and before the plunger is lowered.

5. In apparatus for the manufacture of hollow ingots the combination of a step-by-step conveyor, a series of moulds upon the conveyor s as to be brought successively into moulding position, a plunger mounted above the moulding position, means for lowering the plunger into the moulds in the moulding position and an additional upper mould portion so located as to be superimposed above the mould in the moulding position and to extend the same vertically.

6. Apparatus as claimed in claim 5, wherein the upper portion of the mould is in a plurality of sections divided vertically and arranged to be advanced into place above the bottom section of the mould from opposite sides of the axis thereof.

ERNEST FRASER JONES.